United States Patent
Itozawa et al.

(10) Patent No.: US 12,405,612 B2
(45) Date of Patent: Sep. 2, 2025

(54) AREA RECOGNITION SYSTEM, USING MAGNETIC SENSORS, AREA RECOGNITION METHOD, USING MAGNETIC SENSORS, AND PROGRAM FOR EXECUTING AREA RECOGNITION METHOD USING MAGNETIC SENSORS

(71) Applicant: TOYOTA JIDOSHA KABUSHIKI KAISHA, Toyota (JP)

(72) Inventors: Yuta Itozawa, Nagoya (JP); Kunihiro Iwamoto, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 210 days.

(21) Appl. No.: 18/308,999

(22) Filed: Apr. 28, 2023

(65) Prior Publication Data

US 2023/0367329 A1 Nov. 16, 2023

(30) Foreign Application Priority Data

May 16, 2022 (JP) .................................. 2022-080178

(51) Int. Cl.
  *G05D 1/02* (2020.01)
  *G05D 1/00* (2006.01)
(52) U.S. Cl.
  CPC ......... *G05D 1/0259* (2013.01); *G05D 1/0223* (2013.01)
(58) Field of Classification Search
  CPC ........................... G05D 1/0259; G05D 1/0223
  See application file for complete search history.

(56) References Cited

U.S. PATENT DOCUMENTS

| | | | |
|---|---|---|---|
| 4,817,750 A | 4/1989 | Ishida et al. | |
| 2011/0160949 A1* | 6/2011 | Kondo | G05D 1/0265 701/23 |

FOREIGN PATENT DOCUMENTS

| | | | |
|---|---|---|---|
| JP | S62-288908 A | | 12/1987 |
| JP | 05-189028 A | | 7/1993 |
| JP | H05189028 A | * | 7/1993 |
| JP | 2000099146 A | * | 4/2000 |

OTHER PUBLICATIONS

English translation of JP H05189028 A (Year: 1993).*
English translation of JP-2000099146-A (Year: 2000).*

* cited by examiner

*Primary Examiner* — Todd Melton
*Assistant Examiner* — Matthew Ho
(74) *Attorney, Agent, or Firm* — Sughrue Mion, PLLC (57) ABSTRACT

An area recognition system, an area recognition method, and a program that simplify a control logic for recognizing a movement between travel areas are provided. An area recognition system recognizes a travel area of a robot. A magnetic member having a first magnetic pole and a magnetic member having a second magnetic pole different from the first pole are disposed between different travel areas. The robot includes a first magnetic sensor, a second magnetic sensor provided at a position different from a position where the first magnetic sensor is provided along a traveling direction of the robot, and a recognition unit configured to recognize a movement of the robot between the different travel areas by the first magnetic sensor detecting the first magnetic pole and the second magnetic sensor detecting the second magnetic pole.

5 Claims, 5 Drawing Sheets

AREA RECOGNITION SYSTEM, USING MAGNETIC SENSORS, AREA RECOGNITION METHOD, USING MAGNETIC SENSORS, AND PROGRAM FOR EXECUTING AREA RECOGNITION METHOD USING MAGNETIC SENSORS

CROSS REFERENCE TO RELATED APPLICATIONS

This application is based upon and claims the benefit of priority from Japanese patent application No. 2022-080178, filed on May 16, 2022, the disclosure of which is incorporated herein in its entirety by reference.

BACKGROUND

The present disclosure relates to an area recognition system, an area recognition method, and a program.

In some cases, a track for driverless vehicles is divided into high-speed sections and low-speed sections. Japanese Unexamined Patent Application Publication No. H05-189028 discloses a technique for providing N-pole magnets and S-pole magnets between low-speed sections and high-speed sections to recognize areas.

SUMMARY

In some cases, two magnetic members having magnetic poles different from each other are provided between the travel areas to determine the travel area. In such a case, it was necessary to determine that the two magnetic poles were detected in order, which complicated the control logic.

The present disclosure has been made to solve such a problem, and an object thereof is to provide an area recognition system, an area recognition method, and a program that simplify a control logic for recognizing a movement between travel areas.

In an aspect, an area recognition system for recognizing a travel area of a robot includes:
  two magnetic members disposed between different travel areas.
  Polarities of the two magnetic members on upper surface sides thereof are different from each other,
  the robot comprises:
    a first magnetic sensor;
    a second magnetic sensor provided at a position different from a position where the first magnetic sensor is provided along a traveling direction of the robot; and
    a recognition unit configured to recognize a movement of the robot between the different travel areas by the first magnetic sensor detecting one of the two magnetic members and the second magnetic sensor detecting another of the two magnetic members.

In another aspect, an area recognition method for recognizing a travel area of a robot,
  two magnetic members being disposed between different travel areas,
  polarities of the two magnetic members on upper surface sides thereof being different from each other,
  the robot comprising:
    a first magnetic sensor;
    a second magnetic sensor provided at a position different from a position where the first magnetic sensor is provided along a traveling direction of the robot,
  the area recognition method comprising:
    recognizing, by the robot, a movement between the different travel areas by the first magnetic sensor detecting one of the two magnetic members and the second magnetic sensor detecting another of the two magnetic members.

In another aspect, a program causes a computer to execute the above area recognition method.

According to the present disclosure, it is possible to provide an area recognition system, an area recognition method, and a program that simplify a control logic for recognizing a movement between travel areas.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Although the present disclosure is described below through the embodiment of the disclosure, the disclosure in the claims is not limited to the following embodiment. Moreover, not all of the configurations described in the embodiment are essential as means to solve the problem.

First Embodiment

Figure 1:
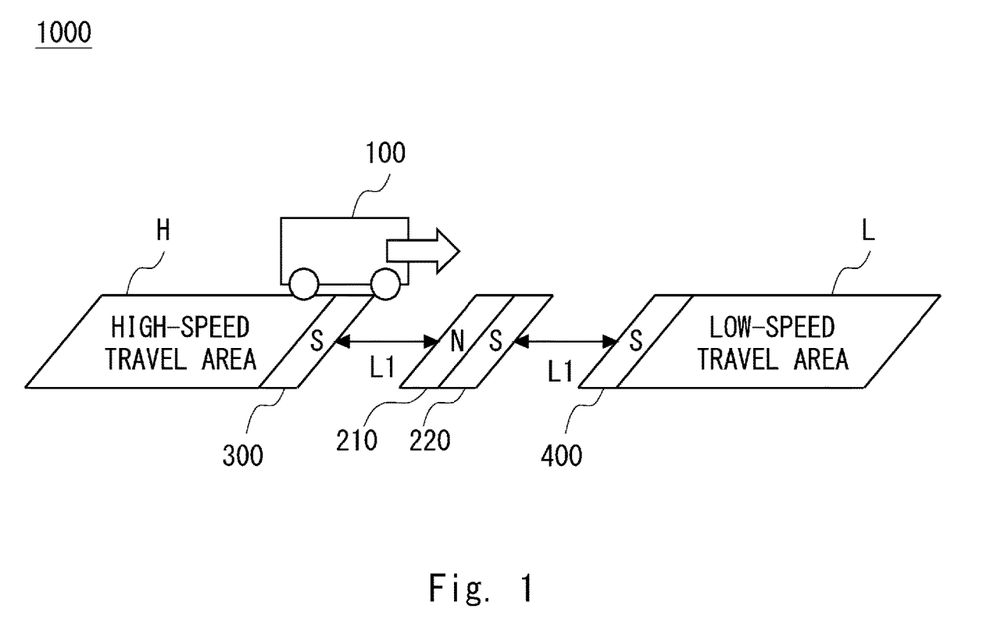
FIG. 1 is an overview diagram showing a configuration of an area recognition system according to a first embodiment.

An area recognition system according to a first embodiment is described below with reference to the drawings. FIG. 1 is an overview diagram showing a configuration of an area recognition system 1000 according to the first embodiment. The area recognition system 1000 is a system for recognizing a travel area of a robot 100.

The area recognition system 1000 includes the robot 100. The travel area of the robot 100 includes a high-speed travel area H and a low-speed travel area L. The robot 100 may be a conveying robot that conveys a load. The area recognition system 1000 may further include a server (not shown) that generates a traveling route for the robot 100. The area recognition system 1000 may also include a system in which processing is completed within the robot 100.

In the high-speed travel area H and the low-speed travel area L, for example, a maximum speed of the robot 100 may be defined. In such a case, the maximum speed in the high-speed travel area H is greater than the maximum speed in the low-speed travel area L.

The area recognition system 1000 includes magnetic members 210 and 220. The magnetic members 210 and 220 are disposed between the high-speed travel area H and the low-speed travel area L. The magnetic members 210 and 220 may be magnetic tapes or magnets. The magnetic members 210 and 220 are arranged along a direction in which the robot 100 travels (this direction is hereinafter referred to as a traveling direction). The arrows in FIG. 1 indicate the traveling direction of the robot 100. The magnetic member 210 is also referred to as a first magnetic member, and the magnetic member 220 is also referred to as a second magnetic member.

The magnetic members 210 and 220 are used by the robot 100 to recognize the travel area. The polarity of the magnetic member 210 on the upper surface side thereof (e.g., the N-pole) and the polarity of the magnetic member 220 on the upper surface side thereof (e.g., the S-pole) are different from each other. The magnetic member 210 is arranged on the side of the high-speed travel area H, and the magnetic member 220 is arranged on the side of the low-speed travel area L. The polarity of the magnetic member 210 on the upper surface side thereof is referred to as a first magnetic pole, and the polarity of the magnetic member 220 on the upper surface side thereof is referred to as a second magnetic pole. The first magnetic pole is one of the N- and S-poles. In the following description, a case in which the first magnetic pole is the N-pole and the second magnetic pole is the S-pole will be mainly described. The first magnetic pole may be the S-pole and the second magnetic pole may be the N-pole.

When the robot 100 includes a safety apparatus described later, the magnetic member 300 and the magnetic member 400 may be provided between the travel areas of the robot 100. The magnetic member 300 and the magnetic member 400 are used to switch the state of the safety apparatus between a stopped state and an operable state. The polarity of the magnetic member 300 on the upper surface side thereof (e.g., the S-pole) and the polarity of the magnetic member 400 on the upper surface side thereof (e.g., the S-pole) are the same. It should be noted that first embodiment may include examples where the magnetic members 300 and 400 are not provided. A distance L1 indicates a distance between the magnetic member 210 and the magnetic member 300, and a distance between the magnetic member 220 and the magnetic member 400. The distance L1 must satisfy the conditions described later. The magnetic member 300 and the magnetic member 400 are also referred to as a third magnetic member.

When the robot 100 includes the safety apparatus, a fourth magnetic member (not shown) is disposed in the low-speed travel area L or the high-speed travel area H. The fourth magnetic member is used to operate the safety apparatus. The polarity of the fourth magnetic member on the upper surface side thereof and the polarity of the magnetic member 300 or the like on the upper surface side thereof are different from each other.

Figure 2:
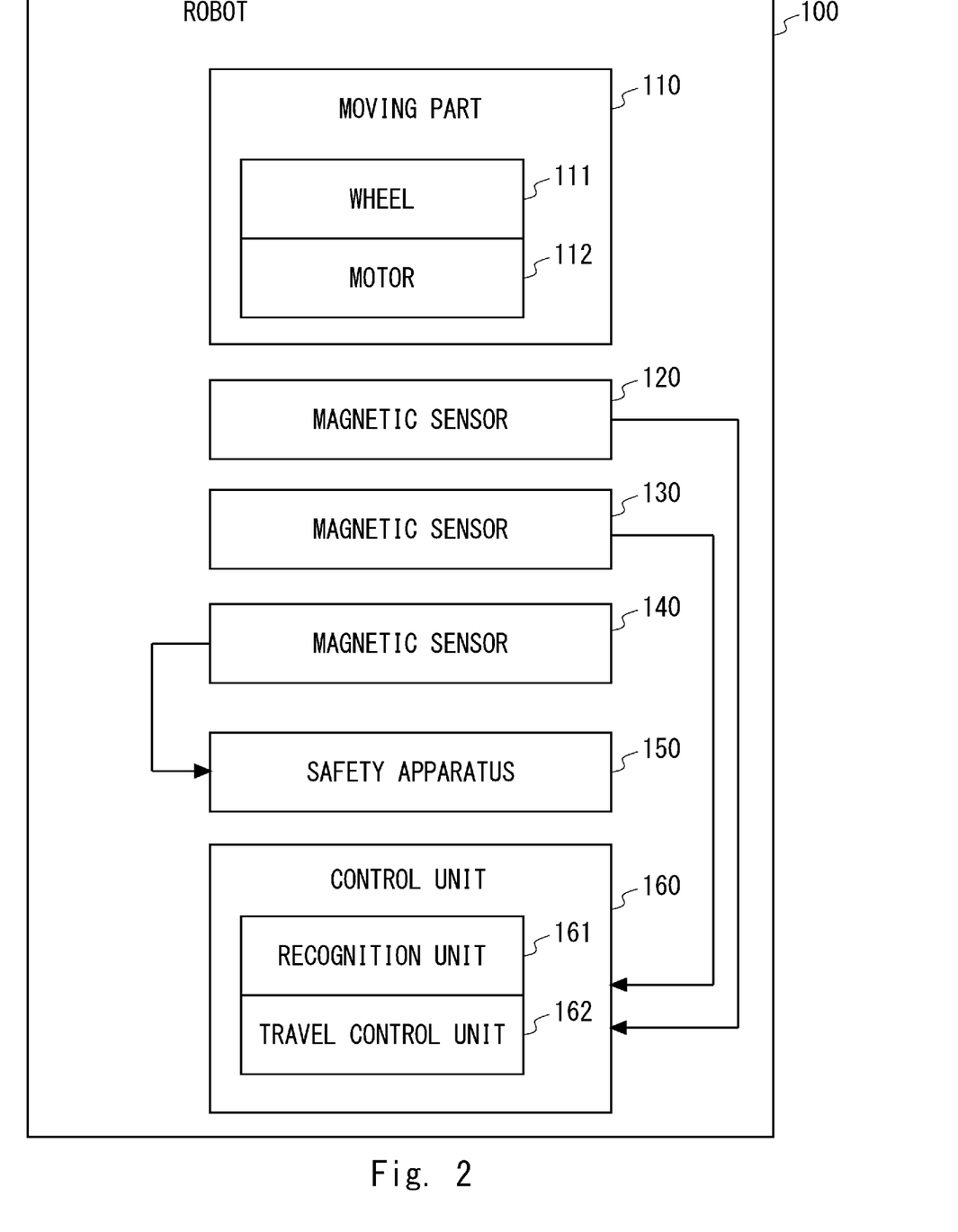
FIG. 2 is a block diagram showing functions of a robot according to the first embodiment.

FIG. 2 is a block diagram showing a functional configuration of the robot 100. The robot 100 includes a moving part 110, a magnetic sensor 120, a magnetic sensor 130, a magnetic sensor 140, the safety apparatus 150, and a control unit 160. The robot 100 may further include a robot arm for moving a load. It should be noted that first embodiment may also include examples where the robot 100 does not include the magnetic sensor 140 and the safety apparatus 150.

The moving part 110 includes a wheel 111 and a motor 112 for rotating the wheel 111. The motor 112 rotates the wheel 111 through a reduction gear or the like. The motor 112 can move the robot 100 to a specified position by rotating the wheel 111 in response to a control signal from the control unit 160. The wheel 111 also may stop or decelerate according to an operation of the safety apparatus 150 described later.

The magnetic sensor 120 detects both the N-pole and S-pole. The magnetic sensor 120 is provided, for example, at the center of the bottom surface of the robot 100. The magnetic sensor 120 is provided on a front side of the magnetic sensor 130 described later in the traveling direction of the robot 100. The magnetic sensor 120 is also referred to as a first magnetic sensor. The magnetic sensor 120 outputs the detection result to control unit 160.

The magnetic sensor 130 detects both the N-pole and the S-pole. The magnetic sensor 130 is provided, for example, at the center of the bottom surface of the robot 100. The magnetic sensor 130 is provided at a different position from the position where the magnetic sensor 120 is provided in the traveling direction of the robot 100. That is, the magnetic sensor 130 is provided on a rear side of the magnetic sensor 120 in the traveling direction of the robot 100. The magnetic sensor 130 is also referred to as a second magnetic sensor. The magnetic sensor 130 outputs the detection result to control unit 160.

The magnetic sensor 140 detects one of the N-pole and the S-pole. The number of magnetic sensors 140 may be plural. The detection result of the magnetic sensor 140 is used to operate the safety apparatus 150. If the robot 100 does not have the safety apparatus 150, the robot 100 may not have the magnetic sensor 140. The plurality of magnetic sensors 140 may be provided on the outer periphery (e.g., four corners) of the bottom surface of the robot 100. The magnetic sensor 140 outputs the detection result to the safety apparatus 150.

Figure 3:
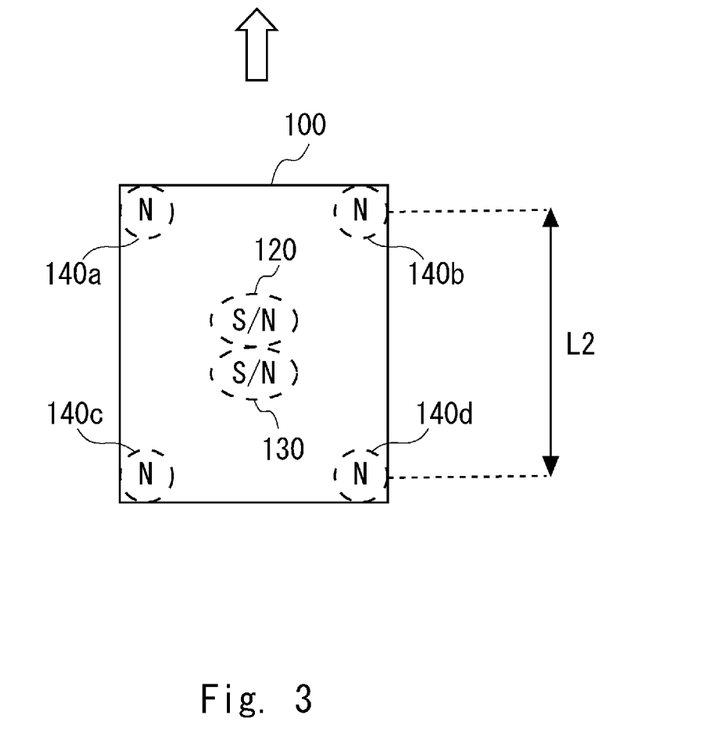
FIG. 3 is a diagram for explaining positions of first and second magnetic sensors.

Next, the positions of the magnetic sensors 120, the magnetic sensor 130, and the magnetic sensor 140 are described with reference to FIG. 3. The magnetic sensors 140*a*, 140*b*, 140*c*, and 140*d* are specific examples of the magnetic sensor 140 described above. FIG. 3 shows an example in which the robot 100 includes four magnetic sensors 140*a*, 140*b*, 140*c*, and 140*d*, but the number of magnetic sensors 140 is not limited to four. Also, as described above, the robot 100 need not include the magnetic sensors 140*a*, 140*b*, 140*c*, and 140*d*.

FIG. 3 is a top view of the robot 100, and the positions of the magnetic sensors 120, 130, 140*a*, 140*b*, 140*c*, and 140*d* in the horizontal plane are indicated by dotted lines. The arrows indicate the traveling direction of the robot 100.

As mentioned above, the magnetic sensor 120 and the magnetic sensor 130 are magnetic sensors capable of detecting both the N- and S-poles. If the magnetic pole for operating the safety apparatus is the N-pole, the magnetic sensors 140*a*, 140*b*, 140*c*, and 140*d* are magnetic sensors capable of detecting the N-pole.

The magnetic sensors 120 and 130 are provided at the center of the bottom surface of the robot 100. In the traveling direction of the robot 100, the magnetic sensor 120 is provided on a front side of the magnetic sensor 130.

The magnetic sensors 140*a*, 140*b*, 140*c*, and 140*d* are provided at four corners of the bottom surface of the robot 100. The magnetic sensors 140*a* and 140*b* are referred to as front magnetic sensors 140 in the traveling direction of the robot 100. The magnetic sensors 140*c* and 140*d* are referred to as rear magnetic sensors 140 in the traveling direction of the robot 100. A distance L2 indicates a distance between the front magnetic sensors 140 and the rear magnetic sensors 140. The distance L1 shown in FIG. 1 must be at least half of the distance L2. This is to prevent malfunction of the safety apparatus 150.

Returning to FIG. 2, the description is continued. The safety apparatus 150 suppresses the operation of the robot 100 in response to a detection of one of the magnetic poles (e.g., the N-pole). As described above, the robot 100 need not include the safety apparatus 150. The safety apparatus 150 operates according to the detection result of the magnetic sensor 140. For example, the safety apparatus 150 may slow down or stop the rotation of the wheel 111 when one of the magnetic poles is detected. The safety apparatus 150 may be implemented as a function of the control unit 160 described later. As described above, the fourth magnetic member (not shown) is disposed in the low-speed travel area L or the high-speed travel area H to increase the safety of the robot 100 to travel. For example, if the fourth magnetic member is disposed in front of the stairs, the area recognition system 1000 can prevent the robot 100 prevented from falling.

The safety apparatus 150 may be configured to be able to switch between a stopped state and an operable state. The safety apparatus 150 may switch states when it receives a predetermined signal from the control unit 160, which will be described later. Therefore, when the state of the safety apparatus 150 is in the operable state, and the magnetic sensor 140 detects one of the magnetic poles, the operation of the robot 100 is suppressed. When the safety apparatus 150 is in the stopped state, the operation of the robot 100 is not suppressed even if the magnetic sensor 140 detects one of the magnetic poles.

The control unit 160 includes a processor and a memory. The control unit 160 includes a recognition unit 161 and a travel control unit 162. Each function of the control unit 160 may be implemented by loading a program (not shown) into the memory and executing the program by the processor.

The recognition unit 161 recognizes that the robot 100 has moved between different travel areas by the magnetic sensor 120 detecting one of the magnetic members 210 and 220 and by the magnetic sensor 130 detecting the other one of the magnetic members 210 and 220. When the magnetic sensor 120 detects the second magnetic pole, and further, the magnetic sensor 130 detects the first magnetic pole, the recognition unit 161 recognizes that the robot 100 has moved from the high-speed travel area H to the low-speed travel area L. When the magnetic sensor 120 detects the first magnetic pole, and further, the magnetic sensor 130 detects the second magnetic pole, the recognition unit 161 recognizes that the robot 100 has moved from the low-speed travel area H to the high-speed travel area L.

The travel control unit 162 controls the movement of the robot 100 based on the area recognition result of the recognition unit 161. Specifically, the travel control unit 162 controls the robot 100 to travel at high speed when the robot 100 travels in the high-speed travel area H and at low speed when the robot 100 travels in the low-speed travel area L. The travel control unit 162 may control the movement of the robot 100 so as not to exceed the maximum speed in the travel area of the robot 100. The travel control unit 162 may further include the function of generating a traveling route for the robot 100.

The control unit 160 may have a function to switch the safety apparatus 150 between the stopped state and the operable state in response to the detection of a magnetic pole (this magnetic pole is also referred to as the other magnetic pole) that is different from a magnetic pole (this magnetic pole is also referred to as one magnetic pole) for operating the safety apparatus. The polarity of the upper surface of the magnetic members 300 and 400 is the other magnetic pole. In such a case, the control unit 160 switches the safety apparatus 150 between the stopped state and the operable state when the magnetic sensor 120 or the like detects the other magnetic pole.

Next, the area recognition method according to the first embodiment is described with reference to FIG. 1. It is assumed that the first magnetic pole is the N-pole, and the second magnetic pole is the S-pole. First, the case where the robot 100 moves from the high-speed travel area H to the low-speed travel area L will be described. The arrow indicates a direction in which the robot 100 moves. A case in which the robot 100 includes the safety apparatus 150 is described.

First, the robot 100 passes over the magnetic member 300, and the magnetic sensor 120 detects the S-pole. Next, the control unit 160 switches the state of the safety apparatus 150 to the stopped state. In other words, the robot 100 deactivates the safety apparatus 150.

The robot 100 then passes over the magnetic member 210 and the magnetic member 220. The magnetic sensor 120 detects the S-pole and the magnetic sensor 130 detects the N-pole. At this time, the magnetic sensor 120 may be positioned right above the magnetic member 220, and the magnetic sensor 130 may be positioned right above the magnetic member 210. Next, the recognition unit 161 of the control unit 160 recognizes a movement from the high-speed travel area H to the low-speed travel area L. The robot 100 need not retain the detection result of the magnetic sensor 120.

The robot 100 has switched the state of the safety apparatus 150 to the stopped state after passing over the magnetic member 300. Therefore, when the robot 100 passes over the magnetic member 210, the safety apparatus 150 does not operate.

However, before the magnetic sensors 140a and 140b shown in FIG. 3 pass over the magnetic member 210, the magnetic sensor 120 must detect the magnetic member 300, and the robot 100 must deactivate the safety apparatus 150. Therefore, as described above, the distance L1 shown in FIG. 1 must be at least half the distance L2 shown in FIG. 3.

The robot 100 may start the low-speed traveling according to the recognition by the recognition unit 161. The robot 100 may start the low-speed traveling when the safety apparatus 150 is reactivated after the recognition unit 161 recognizes the travel area.

Next, the robot 100 passes over the magnetic member 400, and the magnetic sensor 120 detects the S-pole. The control unit 160 then switches the state of the safety apparatus 150 to the operable state. In other words, the control unit 160 reactivates the safety apparatus 150. Thus, the robot 100 can safely travel in the low-speed travel area L.

Next, a case in which the robot 100 moves from the low-speed travel area L to the high-speed travel area H will be described. A description of deactivating and reactivating the safety apparatus 150 will be omitted. First, the robot 100 passes over the magnetic members 210 and 220. The magnetic sensor 120 detects the N-pole, and the magnetic sensor 130 detects the S-pole. At this time, the magnetic sensor 120 may be positioned right above the magnetic member 210, and the magnetic sensor 130 may be positioned right above the magnetic member 220. Next, the recognition unit 161 of the control unit 160 recognizes a movement from the low-speed travel area L to the high-speed travel area H. The robot 100 does not need to retain the detection result of the magnetic sensor 120.

Figure 4:
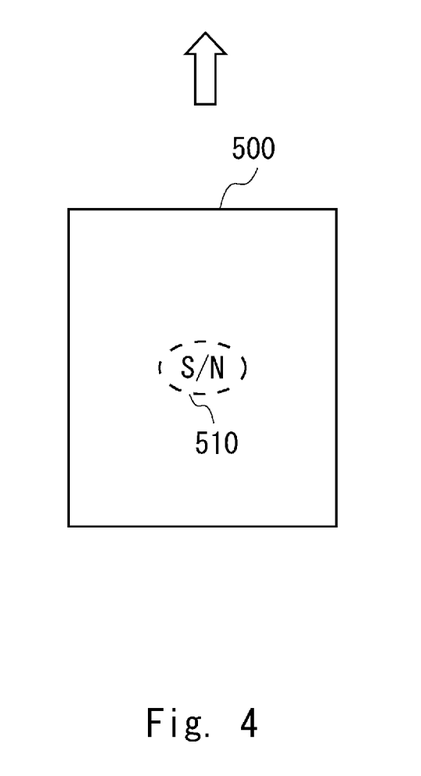
FIG. 4 is top view of a robot according to related art.

Next, with reference to FIG. 4, a supplementary explanation is given on the difference between the first embodiment and related art. FIG. 4 is an overview diagram showing a robot 500 according to the related art viewed from the top. The robot 500 includes a magnetic sensor 510 that can detect both the N- and S-poles. The magnetic sensor 510 corresponds to the magnetic sensor 120 and the magnetic sensor 130 described above. When the robot 500 moves from the high-speed travel area H to the low-speed travel area L in FIG. 1, the robot 500 determines that the magnetic sensor 510 has detected the N-pole and S-pole in order. In such a case, it is necessary to retain the detection result of the N-pole and combine the retained information with the detection result of the S-pole to determine a movement to the low-speed travel area L (see, for example, Japanese Unexamined Patent Application Publication No. H05-189028).

Comparing the related art with the first embodiment, the first embodiment has the effect that the logic for recognizing the travel area can be simplified, because the magnetic sensor detection result need not be retained.

Figure 5:
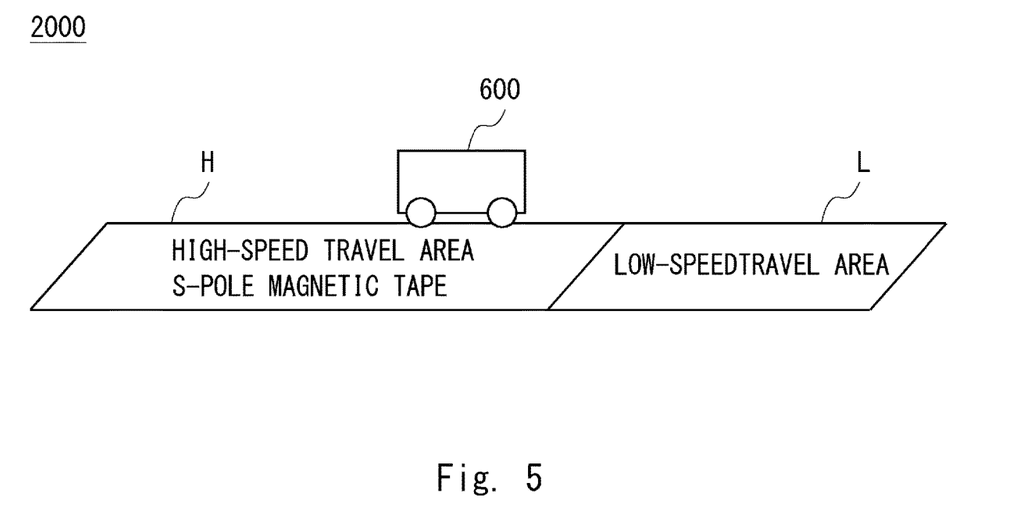
FIG. 5 is an overview diagram showing a configuration of an area recognition system according to related art.

In the first embodiment, it is not necessary to dispose a magnetic member on the entire surface of the low-speed travel area L or the high-speed travel area H. FIG. 5 is an overview diagram showing an area recognition system 2000 according to related art, and shows what the inventor has considered. The area recognition system 2000 includes a robot 600.

A magnetic member (e.g., magnetic tape) having, for example, the S-pole is disposed on the entire surface of the high-speed travel area H of the area recognition system 2000. When the robot 600 is detecting the S-pole, it recognizes that it is traveling in the high-speed travel area H, whereas when the robot 600 is not detecting the S-pole, it recognizes that it is traveling in the low-speed travel area L. The robot 600 may operate the safety apparatus by detecting, for example, a fourth magnetic member (not shown) having the N-pole.

In such a case, the robot 600 can easily recognize the area depending on whether or not the S-pole is detected. However, the area recognition system 2000 has a problem that a magnetic member must be disposed on the entire surface of the low-speed travel area L or the high-speed travel area H. In the area recognition system 1000 according to the first embodiment, there is no need to dispose a magnetic member on the entire surface of the low-speed travel area L or the high-speed travel area, and this system has an advantage that the cost is low compared with related art.

In the above example, the program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

It should be noted that the present disclosure is not limited to the above embodiment and can be changed as appropriate without departing from the purport.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An area recognition system for recognizing a travel area of a robot, the area recognition system comprising:
   a first magnetic member;
   a second magnetic member; and
   a third magnetic member, wherein
   the first magnetic member and the second magnetic member are disposed between different travel areas,
   the third magnetic member is disposed between the different travel areas at a first distance from the first magnetic member or the second magnetic member,
   polarities on upper surface sides of the first magnetic member and the second magnetic member are different from each other,
   the robot comprises:
      a first magnetic sensor provided at a center portion of a bottom surface of the robot;
      a second magnetic sensor provided at the center portion of the bottom surface of the robot and at a position different from a position where the first magnetic sensor is provided along a traveling direction of the robot;
      a plurality of third magnetic sensors comprising one or more front magnetic sensors provided at front corners of the bottom surface of the robot and one or more rear magnetic sensors provided at rear corners of the bottom surface of the robot, a distance between the one or more front magnetic sensors and the one or more rear magnetic sensors being a second distance;
      a memory storing at least one instruction; and
      at least one processor configured to execute the at least one instruction stored in the memory to cause the robot to:
         recognize a movement of the robot between the different travel areas by the first magnetic sensor detecting one of the first magnetic member and the second magnetic member and the second magnetic sensor detecting another of the first magnetic member and the second magnetic member; and
         control a moving speed of the robot based on the movement of the robot between the different travel areas, and
   the first distance is at least half of the second distance, wherein
   the plurality of third magnetic sensors are configured to detect one of an N-pole and an S-pole,
   the robot further comprises a safety apparatus configured to operate based on a result of the detection by the plurality of third magnetic sensors,
   the third magnetic member is disposed between the different travel areas so as to switch a state of the safety apparatus between a stopped state and an operable state, and
   a polarity of the third magnetic member on an upper surface side thereof is another one of the N-pole and the S-pole.

2. The area recognition system according to claim 1, wherein
   the first magnetic sensor and the second magnetic sensor detect both the N-pole and the S-pole.

3. The area recognition system according to claim 2, wherein the first magnetic member is disposed on a side of a high-speed travel area, and the second magnetic member is disposed on a side of a low-speed travel area, the polarity of the first magnetic member on the upper surface side thereof is a first magnetic pole, which is one of the N-pole and the S-pole, the polarity of the second magnetic member on the upper surface side thereof is a second magnetic pole different from the first magnetic pole, the first magnetic sensor is provided on a front side of the second magnetic sensor in the traveling direction of the robot, at least one processor configured to execute the at least one instruction stored in the memory to cause the robot to detect the movement to the low-speed travel area when the first magnetic sensor detects the second magnetic pole, and the second magnetic sensor detects the first magnetic pole, and at least one processor configured to execute the at least one instruction stored in the memory to cause the robot to detect the movement to the high-speed travel area when the first magnetic sensor detects the first magnetic pole, and the second magnetic sensor detects the second magnetic pole.

4. An area recognition method for recognizing a travel area of a robot, using an area recognition system, wherein the area recognition system comprises:

a first magnetic member;

a second magnetic member; and a third magnetic member, wherein the first magnetic member and the second magnetic member are disposed between different travel areas, the third magnetic member is disposed between the different travel areas at a first distance from the first magnetic member or the second magnetic member, the robot comprising:

a first magnetic sensor provided at a center portion of a bottom surface of the robot;

a second magnetic sensor provided at the center portion of the bottom surface of the robot and at a position different from a position where the first magnetic sensor is provided along a traveling direction of the robot,    a plurality of third magnetic sensors comprising one or more front magnetic sensors provided at front corners of the bottom surface of the robot and one or more rear magnetic sensors provided at rear corners of the bottom surface of the robot, a distance between the one or more front magnetic sensors and the one or more rear magnetic sensors being a second distance, wherein the plurality of third magnetic sensors are configured to detect one of an N-pole and an S-pole, wherein the third magnetic member is disposed between the different travel areas so as to switch a state of the safety apparatus between a stopped state and an operable state, and a polarity of the third magnetic member on an upper surface side thereof is another one of the N-pole and the S-pole, wherein the robot further comprises a safety apparatus configured to operate based on a result of the detection by the plurality of third magnetic sensors, the area recognition method comprising:

recognizing, by the robot, a movement between the different travel areas by the first magnetic sensor detecting one of the first magnetic member and the second magnetic member and the second magnetic sensor detecting another of the first magnetic member and the second magnetic member; and    control a moving speed of the robot based on the movement of the robot between the different travel areas, and the first distance is at least half of the second distance.

5. A non-transitory computer readable medium storing a program for causing a computer to execute the area recognition method according to claim 4.

\* \* \* \* \*